(12) United States Patent
Shimizu et al.

(10) Patent No.: US 6,994,256 B2
(45) Date of Patent: Feb. 7, 2006

(54) BARCODE READER

(75) Inventors: Tokuo Shimizu, Hachioji (JP); Akifumi Kabeya, Central Green (SG)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/984,977

(22) Filed: Nov. 9, 2004

(65) Prior Publication Data
US 2005/0092842 A1 May 5, 2005

Related U.S. Application Data

(63) Continuation of application No. PCT/JP03/05997, filed on May 14, 2003.

(30) Foreign Application Priority Data

May 14, 2002 (JP) ............................. 2002-137875

(51) Int. Cl.
*G02B 26/00* (2006.01)
*G06K 7/10* (2006.01)
(52) U.S. Cl. .......................... 235/462.37; 235/462.33; 359/213
(58) Field of Classification Search ........... 235/462.37, 235/462.36, 462.43, 462.33; 359/212, 213, 359/214
See application file for complete search history.

(56) References Cited

U.S. PATENT DOCUMENTS

| | | | | |
|---|---|---|---|---|
| 5,009,473 A | * | 4/1991 | Hunter et al. ................ | 359/214 |
| 5,629,510 A | * | 5/1997 | Quinn et al. ............ | 235/462.36 |
| 6,056,200 A | * | 5/2000 | Dvorkis et al. ......... | 235/462.36 |
| 6,360,949 B1 | * | 3/2002 | Shepard et al. ......... | 235/462.43 |
| 6,527,180 B1 | * | 3/2003 | Dvorkis et al. ......... | 235/462.01 |
| 6,568,598 B1 | * | 5/2003 | Bobba et al. ........... | 235/462.39 |
| 2004/0089720 A1 | * | 5/2004 | Barkan et al. .......... | 235/462.37 |

FOREIGN PATENT DOCUMENTS

| | | |
|---|---|---|
| EP | 0 425 844 A2 | 5/1991 |
| EP | 0 456 095 A2 | 11/1991 |
| EP | 0 540 781 A2 | 5/1993 |
| JP | 1-142707 A | 6/1989 |
| JP | 2001-076085 A | 3/2001 |
| JP | 2001-356293 A | 12/2001 |

* cited by examiner

*Primary Examiner*—Jared J. Fureman
(74) *Attorney, Agent, or Firm*—Frishauf, Holtz, Goodman & Chick, P.C.

(57) ABSTRACT

The present invention provides a barcode reader, which irradiates a scanned laser beam onto a barcode symbol and reads the information written in the symbol, wherein a laser beam scanning unit is made by insertion molding as one body with a movable support member, a support member fixed to the main body, and a metallic elastic member connecting these support members, the support members are molded as one body with a scanning mirror, and a permanent magnet is fixed to the support members. A driving coil is provided in proximity to the permanent magnet, and generates an attractive force or a repulsive force to rotate the magnet at a periodic laser beam scanning angle. Further, a stopper mechanism is provided to soften an external impact to the rotation of the scanning mirror.

2 Claims, 7 Drawing Sheets

BARCODE READER

CROSS-REFERENCE TO RELATED APPLICATIONS

This is a Continuation Application of PCT Application No. PCT/JP03/05997, filed May 14, 2003, which was published under PCT Article 21(2) in Japanese.

This application is based upon and claims the benefit of priority from prior Japanese Patent Application No. 2002-137875, filed May 14, 2002, the entire contents of which are incorporated herein by reference.

BACKGROUND OF THE INVENTION

1. Field of the Invention

The present invention relates to a barcode reader which scans and irradiates a laser beam from a scanning mirror onto a barcode symbol, and reads the written information from the reflected light, and more particularly to, improvement of a laser scanner which scans a laser beam.

2. Description of the Related Art

Generally, a well-known barcode symbol consists of multiple bars of different line widths arranged with spaces to express various information according to the pattern of arrangement. Such a barcode symbol is printed on an article, or a printed sticker of a barcode is stuck to an article. A laser beam is scanned and irradiated to a barcode, and the reflected light is optically read and converted into an electric signal, and decoded as information.

Conventionally, as a means for scanning a laser ban, a polygon mirror is rotated with a motor and scanned. This requires a motor driving system, and consumes much electric power. Thus, generally, it is built in a stationary barcode reader, and when reading a barcode, a barcode symbol stuck to an article is brought to the area where a laser beam is irradiated. However, actually, a barcode is sometimes printed on a large heavy article, and a handy barcode reader is demanded, and a compact polygon mirror is developed.

To make a barcode reader portable, a grip is necessary to hold the unit by hand, and the unit must be compact and light with lower power consumption. Particularly, when considering a cordless unit, a problem arises in improvement of a laser beam scanning unit.

Thus, for example, the Jpn. Pat. Appln. KOKAI Publication No. 2001-076085 discloses a laser beam scanning unit, which scans a laser beam by reciprocating a scanning mirror, instead of a conventional polygon mirror. In this laser beam scanning unit, a scanning mirror is supported rotatable, and a permanent magnet is fixed by an arm to the scanning mirror. A coil is provided near the permanent magnet. By reciprocating the coil energizing direction, a magnetic field of the permanent magnet is formed to generate an attractive force or a repulsive force, and the scanning mirror is reciprocated by these forces. A leaf spring (an elastic member) is provided to limit the range of reciprocating the scanning mirror, and energize the mirror in the direction to return essentially to the center position or to promote the reciprocation.

With the above-mentioned structure, the laser beam scanning unit is made compact and light with lower power consumption, and the barcode reader can be made compact and light, realizing long time continuous operation.

When a handy type barcode reader is actually used, a barcode is read at a location where an article to be read information is placed. For example, it is necessary to read a barcode in a warehouse with high temperature and humidity or in a freezer containing frozen foods. Namely, a barcode reader should work correctly even in high-temperature high-humidity conditions to very-low-temperature conditions.

However, the laser beam scanning unit of the barcode reader disclosed in the Jpn. Pat. Appln. KOKAI Publication No. 2001-076085 uses one of resin, rubber and elastomer as an elastic member of a leaf spring, which limits the scanning mirror reciprocating range, and energizes the mirror in the direction to return essentially to the center position or to promote the reciprocation. Particularly, the mechanical characteristics of the elastic member made of resin are highly dependent on temperature, especially the temperature-dependence of the modulus of elasticity may increase the driving energy at a low temperature or change the scanning angle as a result of the increased driving energy. This suggests that when the laser beam scanning unit is reciprocated with the eigen frequency $f0$, the eigen frequency $f0$ is temperature dependent. When the unit is reciprocated with the eigen frequency $f0$, the energy consumption can be minimized, and this is useful for a handy type barcode reader driven by a battery power. However, on the other hand, the eigen frequency $f0$ controls the laser scanning speed, and the temperature dependence of the eigen frequency is desirably low to obtain the stable barcode reading. performance always at every temperatures. Further, the change of the scanning angle causes a change of the laser scanning angle, and affects the barcode reading performance.

With a handy type barcode reader, the operator may accidentally drop a barcode unit on the floor, and durability against the impact of dropping is required.

Further, the required performance of a laser beam scanning unit is different in the scanning mirror and the support member, and the unit is constructed with a plurality of parts which are different in the manufacturing method and characteristics. Therefore, the unit is constructed in one body by a certain assembly method, such as gluing, and the assembly error in the component parts have a large influence upon the laser beam scanning stability and optical accuracy. That is, not only the accuracy of the finished parts, but also the uniformity and skill in the assembly work are demanded.

BRIEF SUMMARY OF THE INVENTION

It is an object of the present invention to provide a barcode reader having a compact laser beam scanning unit, wherein metallic material is used for an elastic member which is supported by a support member, limits the range of reciprocating a scanning mirror to scan a laser beam, and promotes the reciprocation; the metallic elastic member and support member are molded as one body by insertion molding in the manufacturing process; different material is used for a support member and a scanning mirror which have different properties and characteristics; these support member and scanning mirror are molded as one body by injection molding; and the laser beam scanning unit is constructed with high accuracy, low temperature dependence of eigen frequency $f0$, and high durability against impact by dropping, while decreasing the accuracy requirement in the assembling process.

To achieve the above object, according to the present invention, there is provided a barcode reader, which scans and irradiates a laser beam to a barcode symbol, and reads from a reflected light the information written in the barcode symbol, comprising a scanning mirror which is periodically rotated to scan and reciprocate a laser beam in a predetermined direction, a permanent magnet which forms a magnetic field, a support member which supports the scanning mirror and the permanent magnet, a metallic elastic member which engages the support member rotatable with a fixed support member provided in the main body of the barcode reader, a driving coil which is arranged to generate an attractive force or a repulsive force between the permanent magnet, and a driving circuit which applies a periodic pulse voltage to the driving coil, wherein a laser beam scanning unit is provided, which generates an attractive force or a repulsive force synchronizing with the pulse voltage from the driving circuit, between the permanent magnet and the driving coil, to periodically rotate the scanning mirror by utilizing the elastic force of the elastic member, a cylindrical pin is provided at the center of the rotation of the upper and lower ends of a scanning mirror which is periodically rotated to scan and reciprocate a laser beam in a predetermined direction, a stopper which is rotatable without restricting the mirror rotation, and controls the movable range when an impact is applied to the scanning mirror, and the movable range is controlled on the center axis of rotation for the direction of rotation center, and a rotating direction range control is arrange on the same surface as the metallic elastic member.

In a barcode reader of the present invention, a laser beam scanning unit is made by insertion molding as one body with a movable support member, a fixed support member fixed to the main body, and an elastic member made of metal connecting these two support members; the support members are molded as one body with a scanning mirror; and a permanent magnet is fixed to the support members. A driving coil is provided in proximity to the permanent magnet to generate an attractive force or a repulsive force to periodically rotate the scanning mirror at a certain angle, so that a scanned laser beam is irradiated to a barcode symbol and the information is read. When an impact is applied to the barcode unit, the pin provided at the center of rotation at the upper and lower ends of the scanning mirror regulates the vertical moving range and rotation range of the scanning mirror.

DETAILED DESCRIPTION OF THE INVENTION

Hereinafter, embodiments of the present invention will be explained in detail.

Figure 1:
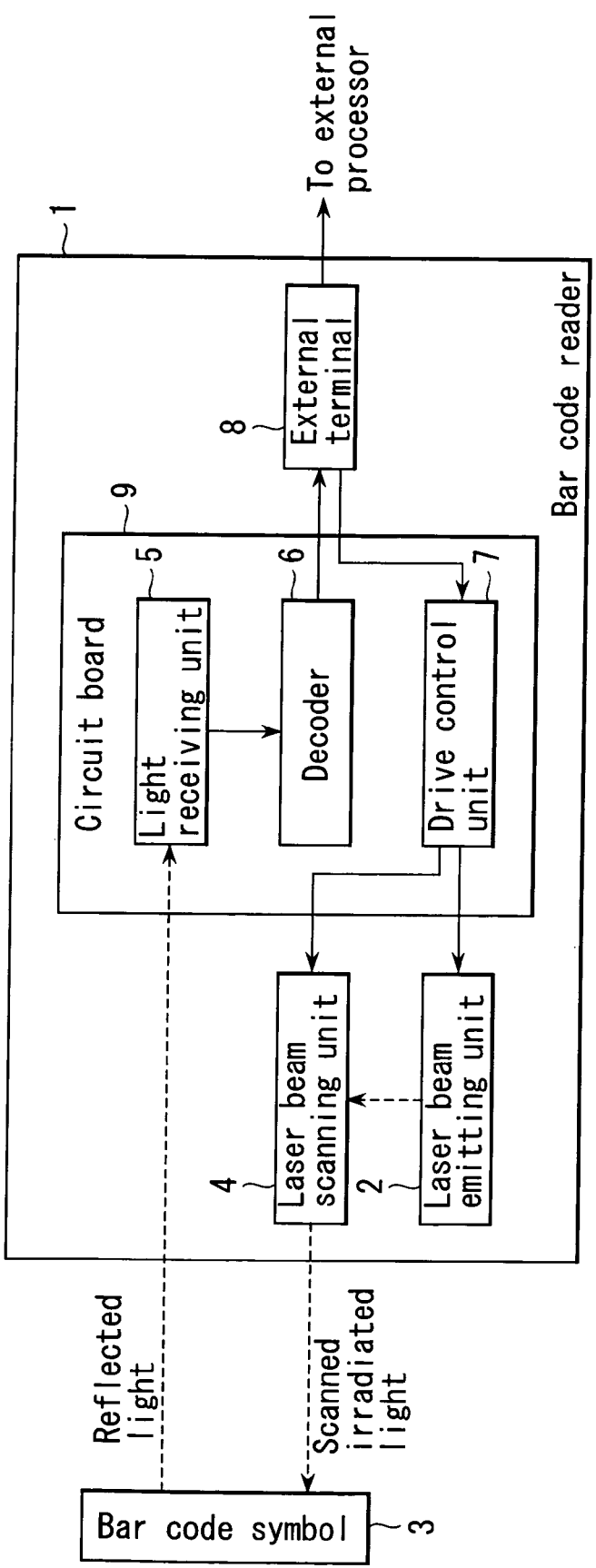
FIG. 1 is a schematic block diagram of a barcode reader according to a first embodiment of the present invention.

FIG. 1 shows the schematic configuration of a barcode reader according to a first embodiment of the present invention.

The barcode reader 1 comprises a laser beam emitting unit 2 which functions as a light source to emit a laser beam; a laser beam scanning unit 4 which scans the leaser beam emitted from the laser beam emitting unit 2, and irradiates it as a scanned laser beam toward a target barcode symbol 3; a light receiving unit 5 which takes in the light reflected from the barcode symbol 3, and generates a detection signal based on the intensity of the reflected light; a decoder 6 which processes the signal detected by the light receiving unit 5, and generates barcode information; and a drive control unit 7 which controls the driving of the laser beam emitting unit 2 and laser beam scanning unit 4. The barcode reader 1 also has an external terminal 8 for connection with a processor of a not-shown external computer. The circuit elements of the light receiving unit 5, decoder 6 and drive control unit 7 are mounted on a circuit board 9. Among these circuit elements, the laser beam emitting unit 2, the light receiving unit 5, the decoder 6, the drive control unit 7 and the external terminal are well-known parts, and detailed explanation of these parts will be omitted.

Figure 2:
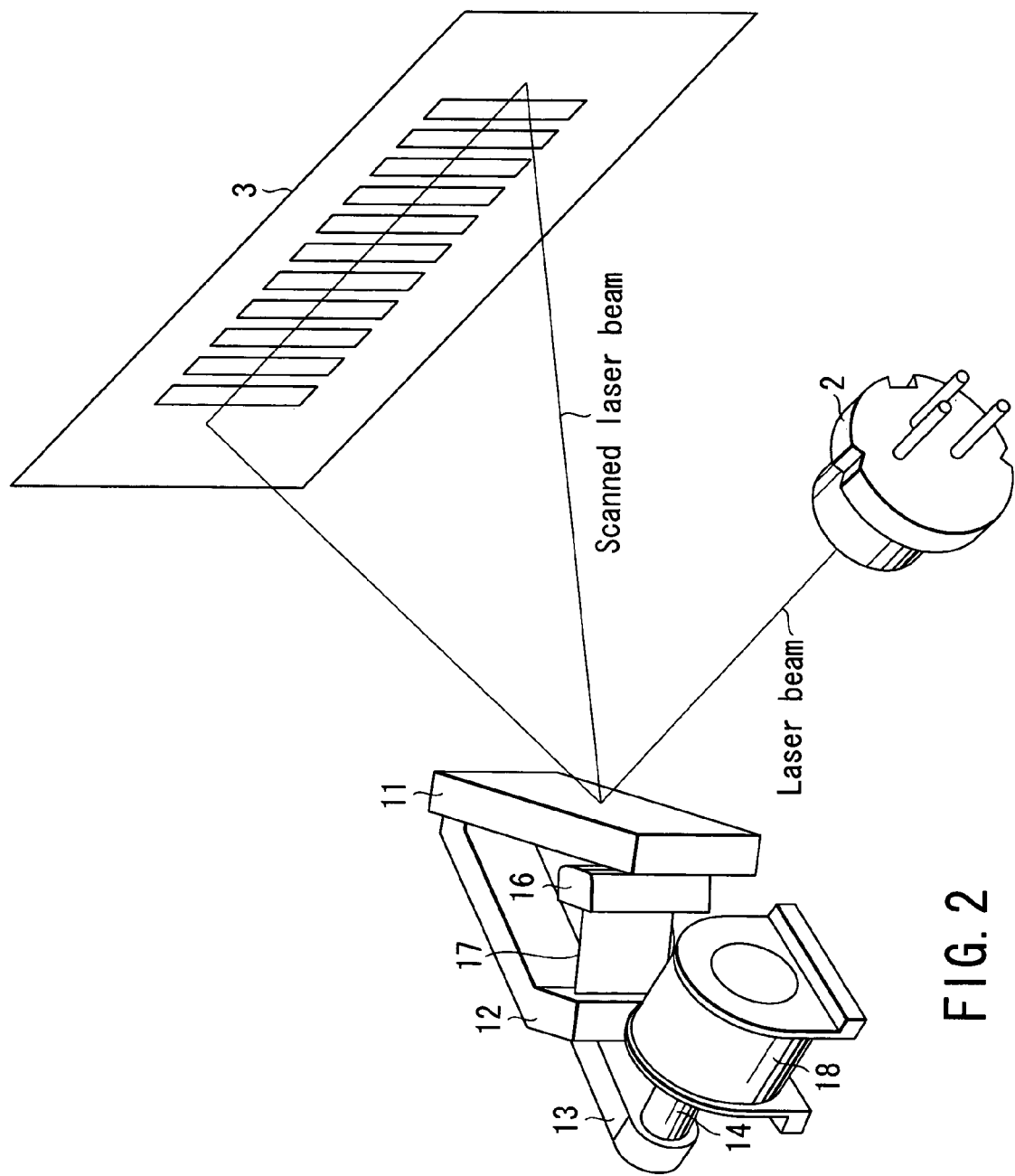
FIG. 2 is a perspective of the structure of a laser scanning unit viewed obliquely downward.

Next, explanation will be given on a concrete configuration of the laser beam scanning unit 4 of the first embodiment. FIG. 2 is a perspective of the structure of the laser scanning unit 4 viewed obliquely downward.

Figures 3A, 3B:
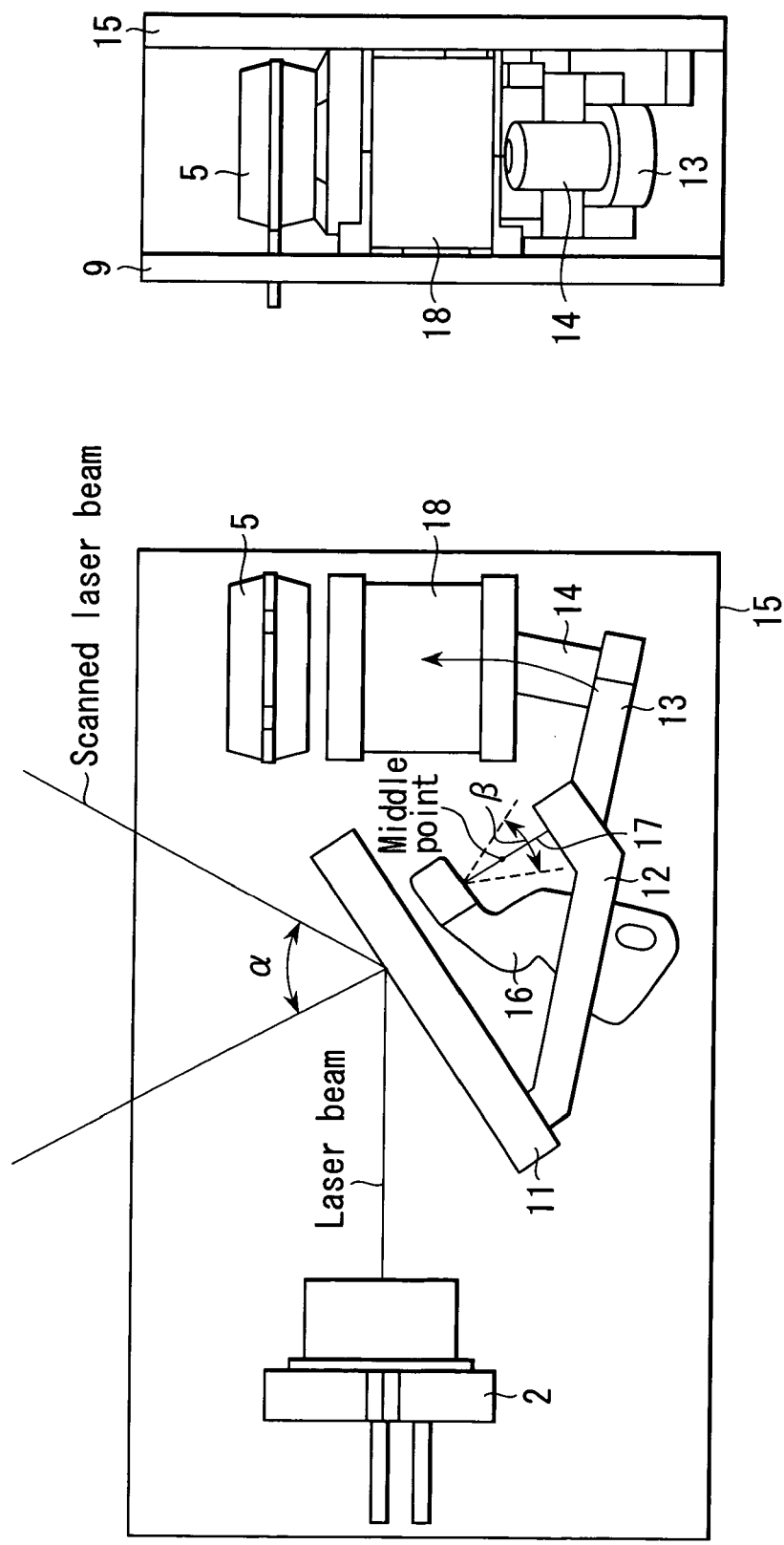
FIG. 3A is a top view showing the configuration of the laser bean scanning unit.
FIG. 3B is a side elevation viewed from a driving coil.

FIG. 3A is a top view showing the configuration of the laser bean scanning 4. FIG. 3B is a side elevation viewed from a driving coil.

The laser beam scanning unit 4 comprises a scanning mirror 11 which periodically rotates at a swinging angle α (a laser beam scanning angle), reflects the laser bam emitted from the laser beam emitting unit 2, and irradiates it in a predetermined direction (a barcode reading direction); a support member 12 whose one end is connected to the end of the rear side (non-mirror side) of the scanning mirror 11; a cylindrical permanent magnet 14 which is provided by a support member 13 at the other end of the support member 12; a fixed support member 16 which is fixed to a main body 15; a metallic elastic member 17 to be described later, which connects the fixed support member 16 to the support member 12; and a driving coil 18 which is provided between the permanent magnet 14 to generate an attractive force or a repulsive force.

The permanent magnet 14 is magnetized in the length direction of the cylindrical shape, and is arranged so that the magnetized direction almost contacts the circle (indicated by an arrow) centering around the center of the length direction of the metallic elastic member 17. The driving coil 18 is fixed to the main body, and arranged with the center axis of the inside core is almost parallel to the magnetized direction of the permanent magnet 14, so as to generate an attractive force almost parallel to the magnetized direction of the permanent magnet 14. In this embodiment, the permanent magnet 14 is fixed to the support member 12, and the driving coil 18 is fixed to the main body. But, contrarily, it is also permitted to provide a driving coil 18 in the support member 12, and to fix the permanent magnet 14 to the main body.

The metallic elastic member 17 is made of metallic material and shaped flat, rotatable against the main body by the support member 12, and fixed almost orthogonal to the mirror surface of the scanning mirror. By the attractive force generated between the permanent magnet 14 and the driving coil 18, flexible oscillation occurs in the elastic member, and the scanning mirror 11 is periodically rotated at a swinging angle of α centering around about the middle point in the length direction of the flexible deformation β.

The metallic elastic member 17 is designed with the optimum thickness and width, so that a primary bending oscillation mode is generated at 50 Hz in the state that the members of the movable side, including the scanning mirror 11, the support members 12/13 and the permanent magnet 14, are being mounted.

Next, explanation will be given on a method of manufacturing the laser beam scanning unit 4 by referring to FIG. 3A and FIG. 3B. First, create a die for the injection molding of the support members 12/13 and the fixed support member 16. Create the die so that one end of the support member 12 is connected to one end of the fixed support member by the metallic elastic member 17, as shown in FIG. 3A. Namely, when the metallic elastic member 17 is inserted into the die and resin such as polycarbonate is injected, the support member 12 and fixed support member 16 can be molded as a single unit holding the metallic elastic member 17 therebetween. This eliminates the necessity of a later assembly step of connecting the metallic elastic member 17 to the support member 12 and fixed support member 16 by gluing. Further, since the members are constructed as a single unit by the resin molding, the metallic elastic member 17 is very stably fused to the support member 12 and the fixed support member 16. This is regarded as a primary molding.

Further, make the main body of the scanning mirror by re-inserting it together with the primary molding, so that the main body of the scanning mirror is fused to the other end of the support member, and perform the second time insertion molding to mold it as one body with the primary molding. In this second time molding, the optical parts grade resin material is adopted to make the main body of the scanning mirror. Next, make a mirror by evaporating or sputtering a reflection material with a high reflectivity, such as aluminum, on the reflecting surface of the main body of the scanning mirror.

Generally, the optical parts grade resin material is often inferior in the mechanical characteristics, especially the strength and adhesiveness, and the price, compared with other engineering plastics. But, by dividing the molding process into two steps as explained above, it is possible to mold the parts as a single unit by the material with suitable characteristics, by using the resin material with the excellent mechanical characteristics and low price for the structural members, and the optical grade material for the optical parts.

Next, fix the permanent magnet 14 to the support member 13. An adhesive may be used for the fixing, or it is also permitted to make a projection in the support member 13, and a recess in the permanent magnet 14, and fit them to each other.

Assemble and fix the fixed support member 16 of the laser beam scanning unit 4 made as a single unit as above mentioned, to the main body 15, as shown in FIG. 3. Further, assemble and fix the laser beam emitting unit 2, the light receiving unit 5 and the driving coil 18.

Now, explanation will be given on optimization of the thickness and width of the metallic elastic member 17 by referring to FIG. 4. Here, the metallic elastic material 17 is made as a plate with the effective length of 2.6 mm and width of 2.8 mm. On the assumption that the scanning mirror 11, the support member 12/13 and the permanent magnet 14 are mounted on the movable side of the metallic elastic member 17, give the metallic elastic member 17 a frequency of 50 Hz and excellent durability.

Figure 4:
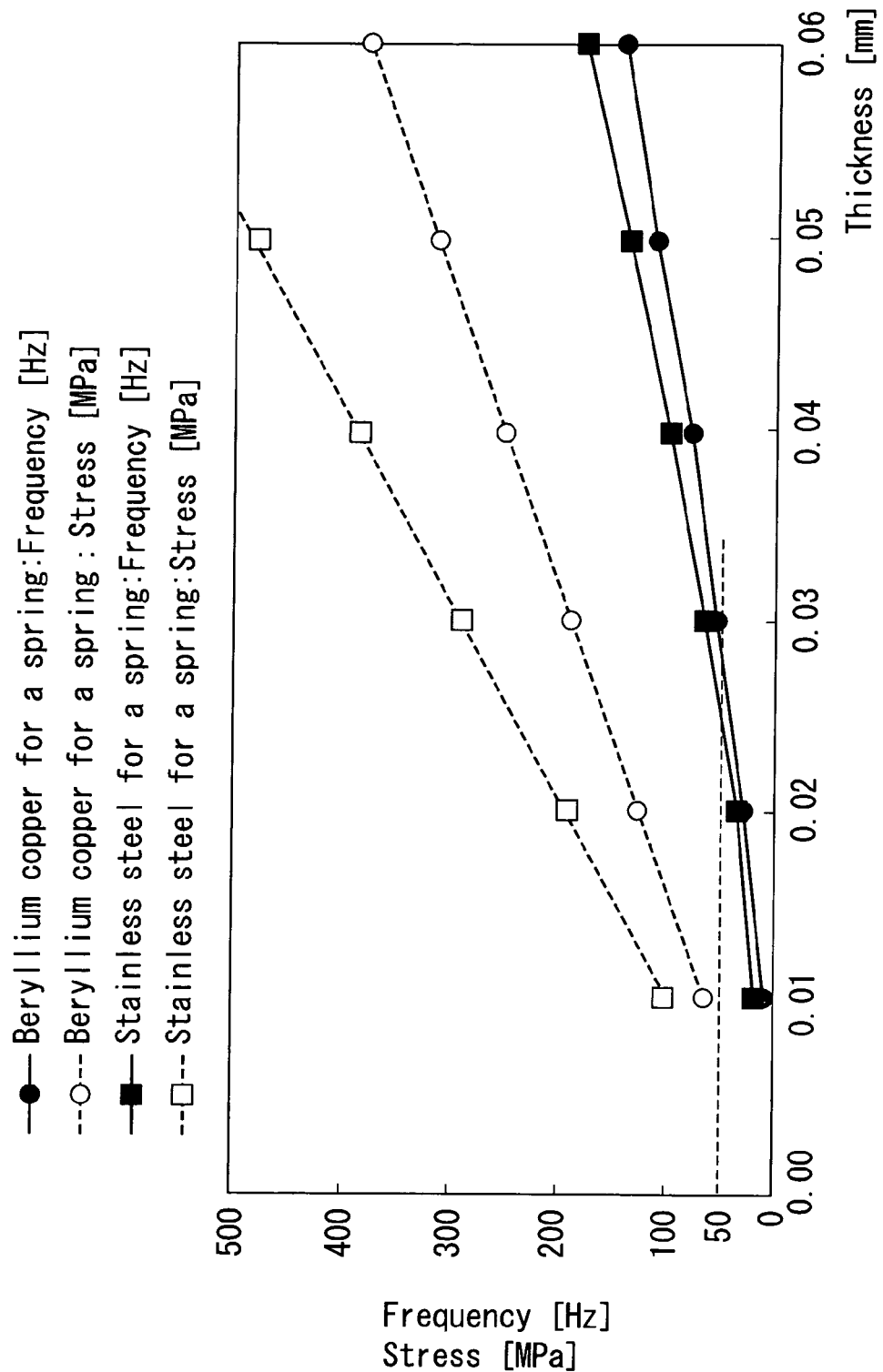
FIG. 4 is a graph for explaining the characteristics of the metallic elastic member of this embodiment.

In FIG. 4, calculate the optimum thickness to obtain a frequency of 50 Hz by using beryllium copper or stainless steel for a spring as a material of the metallic elastic member, and the stress applied to the metallic elastic member when the laser beam scanning angle α is rotated on the condition of 60 degrees. According to the calculation results, it is seen that the thickness of about 0.03 mm is suitable for obtaining the frequency of 50 Hz. It is also seen that on the condition of the 0.03 mm thickness, the stress of the beryllium copper for a spring is 30% lower than that of the stainless steel.

In the laser beam scanning unit 4 using the above-mentioned metallic elastic member 17, by applying a pulse voltage of 50 Hz from the drive control unit 7 to the driving coil 18, the driving coil 18 gives the permanent magnet 14 a periodic force synchronizing with the pulse voltage, in the direction almost parallel to the magnetized direction of the permanent magnet 14.

This force acts on the metallic elastic member 17 together with the member of the movable side as an excitation torque to rotate the scanning mirror 11 to continue resonance in the primary bending oscillation mode of 50 Hz. The scanning mirror is rotated so as to reciprocate continuously at a certain swinging angle α centering around the above-mentioned middle point. The support members 12 and 13 adopt polycarbonate as materials, and consist of the structural members with excellent strength. The main body of the scanning mirror is made of the optical parts grade resin material.

Thus, by using the above-mentioned metallic material for the metallic elastic member 17, it is possible to minimize a mechanical change by temperatures. Particularly, when using beryllium copper for a spring, unlike when using ordinary iron group metallic material, the magnetic driving circuit is not influenced, realizing the excellent durability required for a laser scanning unit of a barcode scanner needed to operate for a long time at a large angle.

The metallic elastic member is preferably made of non-magnetic material. It can be made of bronze phosphate or titanium for a spring as well as beryllium copper or non-magnetic stainless steel for a spring. In this embodiment, the metallic elastic member is made of single metal (one kind of metal), but the material is not to be limited to this, and the elastic member may be made of alloy, and it is also permitted to make a plurality of metals as thin plates and laminate them to form one plate. Further, in this embodiment, the metallic elastic member is made as a rectangular plate, but it may be shaped like a barrel with a curve on the side, or a shape narrowed at the center. Other forms are also permitted, for example, a plate having one or a plurality of holes, a plate having different thickness at the center and edge, and a plate with a projection like a stripe or serrations.

Next, explanation will be given on a barcode reader according to a second embodiment. FIG. 5, FIG. 6, FIGS. 7A, 7B and 7C show examples of the configuration of a laser beam scanning unit having a stopper mechanism according to the second embodiment.

The scanning mirror of the laser beam scanning unit in the afore-mentioned barcode reader of the first embodiment is supported by the metallic elastic member 17, and when it is exposed to an external impact, the laser scanning may be disturbed by oscillation, and the metallic elastic member 17 may be deformed in some cases.

In this embodiment, a stopper mechanism is provided to prevent oscillation and damage caused by an impact. The stopper mechanism prevents vertical oscillation of the scanning mirror 21 without restricting the rotation of the scanning mirror 21, by providing cylindrical pins 31a and 32a (a first control position) at the middle point (the middle point shown in FIG. 3A) of the rotational movement of the upper and lower ends of the scanning mirror 21. Further, a pin 31b (a second control position) is provided to control the movable range when an impact is applied to the scanning mirror 21.

Therefore, the stopper mechanism controls the movable range on the rotation center axis for the impact in the direction of rotation center axis, when an external impact is applied to the scanning mirror 21, and controls the movable range on the same plane as the metallic elastic member 17 for the impact in the direction of rotation. This makes it possible to prevent deformation and buckling, without applying an abnormal force to the metallic elastic member 17.

TABLE 1

| Eigen | Temperature (° C.) | | | | | | | | Change rate of eigen frequency |
|---|---|---|---|---|---|---|---|---|---|
| frequency (Hz) | −20 | −10 | 0 | 10 | 20 | 30 | 40 | 55 | f0 (%) |
| Resin | 20.9 | 20.7 | 20.4 | 20.0 | 19.7 | 19.3 | 19.1 | 18.3 | 14 |
| Beryllium copper | 48.7 | 48.7 | 48.5 | 48.4 | 48.3 | 48.1 | 47.8 | 47.6 | 2 |

Figure 5:
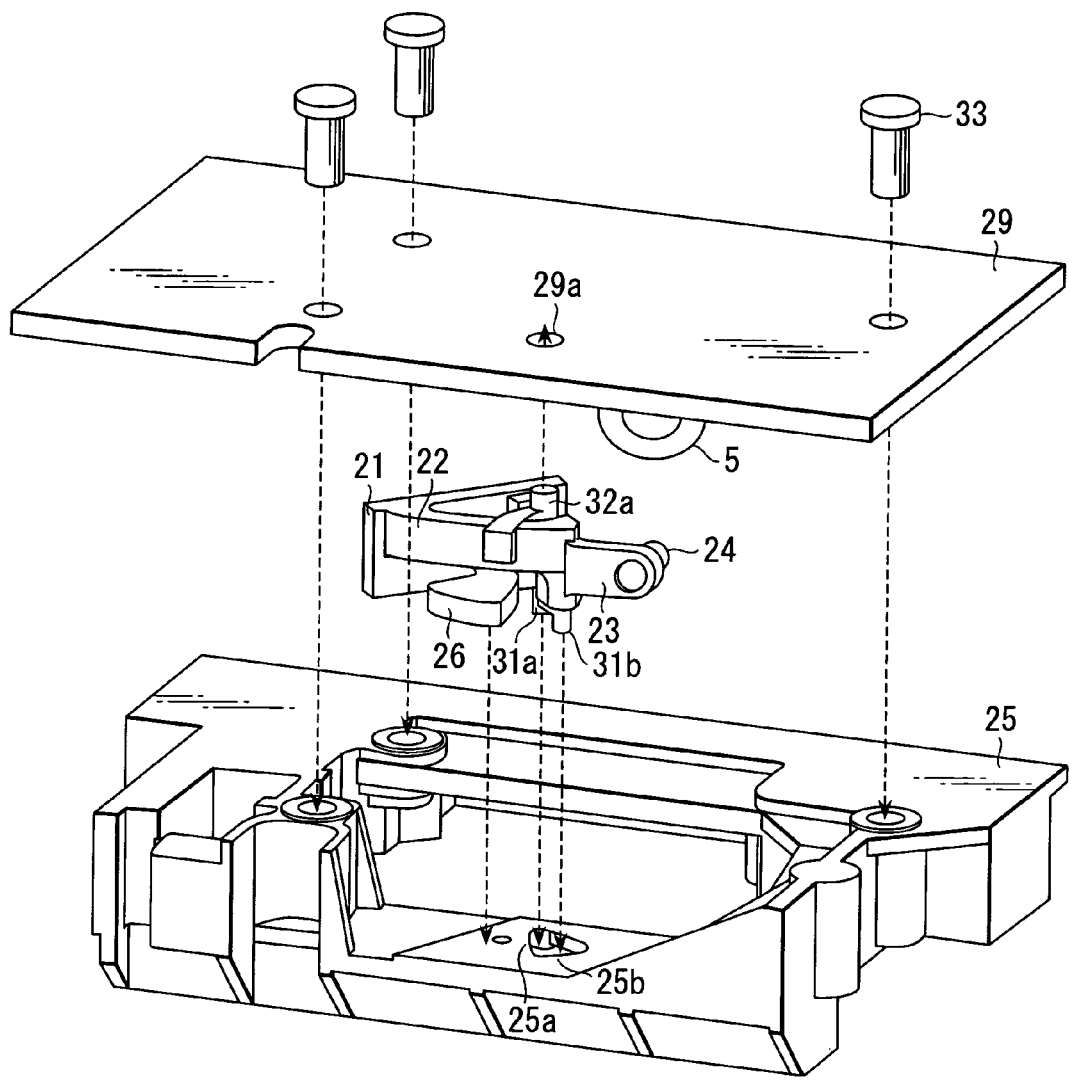
FIG. 5 is an external view showing a stopper mechanism of a barcode reader according to a second embodiment of the present invention.

Concretely, as shown in FIG. 5, a cylindrical pin 31a is provided at the center of rotation below the scanning mirror 21, and a cylindrical pin 31b is provided below the support member 22, to which the metallic elastic member 17 is fixed. In the main body (housing) 25, a movable range control unit 25b comprising a fan-shaped groove (or a hole) is provided. The fan-shaped groove of the movable range control unit 25b has a hole 25a at the pivot, which is fitted with the pin 31a without limiting its rotation. The pin 31b is movably fitted along the edge of the fan.

Above the scanning mirror 21, the cylindrical pin 32a is provided at the center of rotation. A circuit board 29 arranged above the scanning mirror 21 has a hole 29a, which also controls the movable range as described above, and into which the pin 32a is inserted. The circuit board 29 is fixed to the main body 25 with a screw 33.

The pins 31a and 32a are fitted in the holes 25a and 29a, coaxial with the centers of the rotation of the scanning mirror 21 and the rotation of the pins 31a and 32a.

Figure 6:
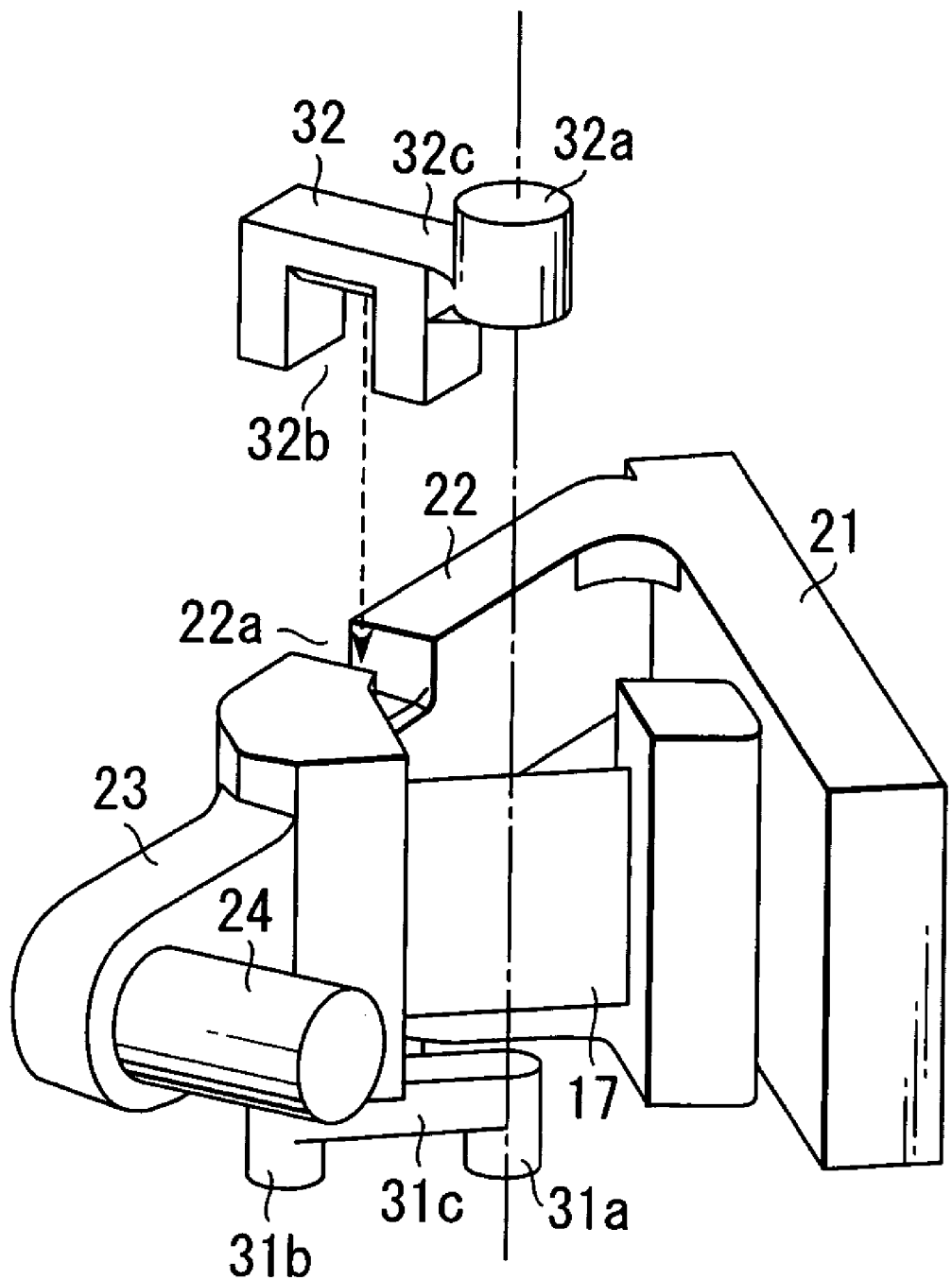
FIG. 6 is a perspective of a laser beam scanning unit provided with a stopper mechanism viewed obliquely downward.
Figure 7A:
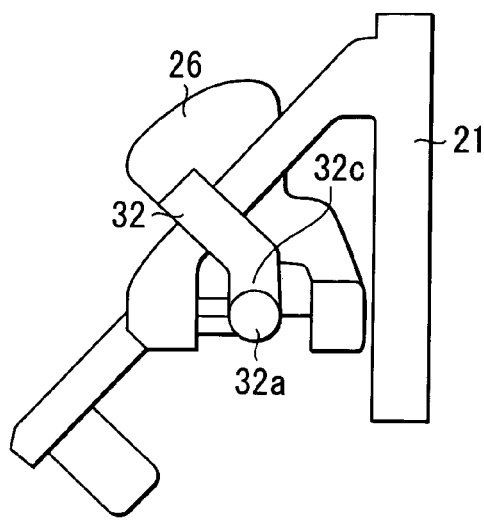
FIG. 7A is a top view showing the configuration of the laser beam scanning unit.
Figure 7B:
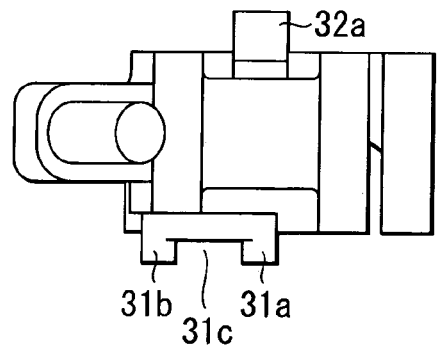
FIG. 7B is a side view of the laser beam scanning unit.
Figure 7C:
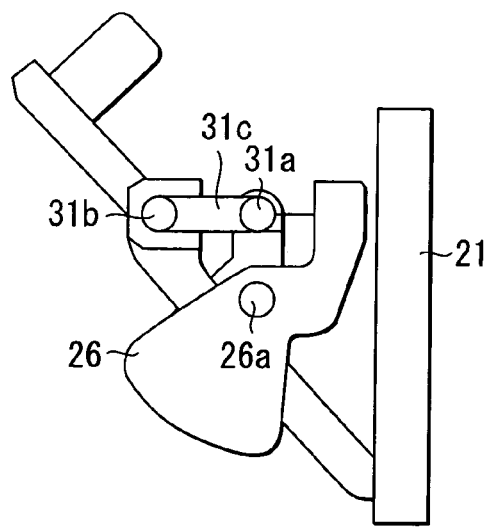
FIG. 7C is a bottom view of the laser beam scanning unit.

Further, as shown in FIG. 6, a groove 22a is cut in the upper end of the support member 23, and a control unit 32 has a U-shaped part 32c having a groove 32b to fit with the groove 22a. The grooves 22a and 32b are fitted and fixed, and the control unit 32 is secured to the support member.

As above described, the center gravity of the movable part including the magnet 24 of the scanning mirror 21 is substantially aligned with the center of the rotation of the scanning mirror 21. The vertical movement is controlled on the center axis of this rotation. The rotation in the normal line direction against the center of the rotation is controlled at the position substantially aligned with the center axis of rotation in the direction orthogonal to the center axis. Further, the control of the rotation direction is provided on the same plan as the metallic elastic member 17.

With the above-mentioned structure, the rotation of the scanning mirror 21 is not controlled when a barcode is normally read, and the rotation range of the scanning mirror 21 is controlled when an impact is applied and the rotation becomes abnormal. The vertical oscillation is controlled by the pins 31a, 32a provided at the upper and lower ends of the support member 22, and the holes 25a, 29a formed in the member fixed to the unit. For horizontal oscillation, the rotation is controlled by moving the pin 31b along the edge of the fan-shape of the movable range control unit 25.

According to Table 1, the rigidity of the resin member increases when the ambient atmospheric temperature lowers, and the numeric value of the eigen frequency f0 increases. Contrarily, beryllium copper is characterized by the very low temperature dependence of eigen frequency f0.

TABLE 2

| Member | Lower stopper (G) | Upper/lower stoppers (G) |
|---|---|---|
| Beryllium for a spring | 1000 | 2500 |
| Resin | 2500 | — |

The Table 2 shows the results of measuring the deformed states of each member when an impact is applied from six directions, based on the standard that the change (angle) of 2° or lower in the scanning direction of the scanning mirror is good. According to the measurement results shown in Table 2, the resin member can be used simply by providing a stopper mechanism in upper and lower sides, and beryllium copper for a spring can resist the impact by providing a stopper mechanism in upper and lower sides.

Therefore, a resin-made scanning mirror, if used in a barcode reader driven by battery power, reduces the battery voltage, and increases the eigen frequency f0 (the rigidity), and as a result of this multiplier effect, a problem of reduced operation time of a barcode reader occurs. On the other hand, when beryllium copper is used, the temperature dependence of the eigen frequency f0 is very low. Compared with using the resin member, this provides the effects that the battery energy consumption becomes small, the battery voltage drop caused by the lowered temperature can be covered, and the operation time of a barcode reader is not reduced.

According to the embodiments explained hereinbefore, the following effects can be obtained.

1. By using a metallic sample, the elastic member has a very low temperature dependence of mechanical characteristics, providing a laser beam scanning unit having stable frequency characteristic and signal response in a wide range of operating environment.

2. Particularly, when using beryllium copper for a spring, the metallic elastic member has high durability and does not have influence on the magnetic driving circuit.

3. By constructing the metallic elastic member and support member as a single unit, there is no parts to glue (connect), an unstable factor such as an assembly error is eliminated, and the assembly cost is reduced.

4. By molding the scanning mirror as a single unit, the position accuracy of each part is determined by the die used for molding, providing high accuracy. Unevenness does not occur in assembling the parts, providing high quality. The assembly cost can be reduced. A connecting means is unnecessary, and compactness can be realized.

5. In molding the mirror and the support member at the same time, when the optical flatness of the mirror cannot be obtained, the molding process is divided into two steps: a primary molding step for inserting the metallic elastic member into the support member, and a secondary molding step for further inserting the part made by the primary molding and combining with the scanning mirror as a single unit. This can provide the mirror with excellent optical performance. Further, no assembly error provides high quality, and reduces the assembly cost. A connecting means becomes unnecessary, and compactness can be realized.

6. In the above effect 5, it is possible to select suitable materials for the primary and secondary moldings, resin suitable for the structural members in the primary molding, and resin suitable for optical parts in the secondary molding. Further, as the position accuracy of each part is determined by the die for molding, unevenness does not occur in the quality of the parts, providing constant high accuracy.

7. By providing a stopper mechanism at the upper and lower ends of the support member to support the scanning mirror, high impact resistance can be obtained.

As above explained in detail, according to the present invention, the reciprocating range of the scanning mirror, which is supported by the support member and scans a laser beam, is controlled; metallic material is used for an elastic member which promotes the reciprocation; and the metallic elastic member and support member are made as a single unit by insertion molding in the manufacturing process. By constructing the support member and scanning mirror with different characteristics and properties as a single unit by injection molding, there is provided a barcode reader having a compact laser beam scanning unit which is configured with high accuracy, less temperature dependence of the eigen frequency f0 and high durability against drop impact, while the accuracy requirement in the assembly work is reduced.

What is claimed is:

1. A barcode reader which scans and irradiates a laser beam onto a barcode symbol and reads information written in the barcode symbol from reflected light, and in which a laser beam scanning unit is mounted, the laser beam scanning unit comprising:

a scanning mirror comprising a resin material for an optical part, which periodically moves rotationally to scan and reciprocate a laser beam in a predetermined direction;

a permanent magnet which forms a magnetic field;

a support member comprising a resin material having a higher strength and a higher adhesive property than the resin material for the optical part, the support member supporting the scanning mirror and the permanent magnet;

a metallic elastic member which engages the support member rotatable with a fixed support member provided in a main body of the barcode reader;

a driving coil which generates an attractive force or a repulsive force between the permanent magnet and the driving coil itself; and a driving circuit which applies a periodic pulse voltage to the driving coil, the laser beam scanning unit generating an attractive force or a repulsive force synchronizing with the pulse voltage from the driving circuit, between the permanent magnet and the driving coil, to periodically move the scanning mirror rotationally by utilizing the elastic force of the elastic member, wherein the metallic elastic member is made to be inserted to the support member by first resin injection molding used for the elastic member, the scanning mirror is made of a material different from that of the support member, to be located on the support member by second resin injection molding, and the support member and metallic elastic member are made as a single integrated unit.

2. A barcode reader, which scans and irradiates a laser beam onto a barcode symbol, and reads the information written in the barcode symbol from reflected light, in which a laser beam scanning unit is mounted, the laser beam scanning unit comprising:

a scanning mirror which periodically moves rotationally to scan and reciprocate a laser beam in a predetermined direction;

a permanent magnet which forms a magnetic field;

a support member which supports the scanning mirror and permanent magnet;

a metallic elastic member which engages the support member rotatable with a fixed support member provided in a main body of the barcode reader;

a driving coil which is arranged to generate an attractive force or a repulsive force between the permanent magnet and the driving coil itself;

a driving circuit which applies a periodic pulse voltage to the driving coil; and a stopper mechanism including a first control unit having a pin-like shape disposed at upper and lower ends of the support member, rotatably engaged to the main body of the barcode reader and supported at a center position of the rotation by the scanning mirror, and a second control unit having a pin-like shape disposed at the lower end of the support member to regulate the rotation range of the support member while scanning along an edge of a sector-shaped trench made in the main body of the barcode reader, the laser beam scanning unit generating an attractive force or a repulsive force synchronized with the pulse voltage from the driving circuit, between the permanent magnet and the driving coil, to periodically move the scanning mirror rotationally by utilizing the elastic force of the elastic member.

* * * * *